United States Patent
Harada et al.

(10) Patent No.: US 11,519,459 B2
(45) Date of Patent: Dec. 6, 2022

(54) FLUID DYNAMIC BEARING DEVICE

(71) Applicant: NTN CORPORATION, Osaka (JP)

(72) Inventors: Kazuyoshi Harada, Mie (JP); Shinji Komatsubara, Mie (JP); Shouhei Oka, Mie (JP); Jun Hirade, Mie (JP)

(73) Assignee: NTN CORPORATION, Osaka (JP)

( * ) Notice: Subject to any disclaimer, the term of this patent is extended or adjusted under 35 U.S.C. 154(b) by 291 days.

(21) Appl. No.: 16/767,285

(22) PCT Filed: Dec. 7, 2018

(86) PCT No.: PCT/JP2018/045171
§ 371 (c)(1),
(2) Date: May 27, 2020

(87) PCT Pub. No.: WO2019/112057
PCT Pub. Date: Jun. 13, 2019

(65) Prior Publication Data
US 2021/0040990 A1   Feb. 11, 2021

(30) Foreign Application Priority Data

Dec. 8, 2017   (JP) .............................. JP2017-235907
Mar. 15, 2018  (JP) .............................. JP2018-047699

(51) Int. Cl.
*F16C 17/02*   (2006.01)
*F16C 17/08*   (2006.01)
*F16C 33/74*   (2006.01)

(52) U.S. Cl.
CPC ............ *F16C 33/741* (2013.01); *F16C 17/02* (2013.01); *F16C 17/08* (2013.01)

(58) Field of Classification Search
CPC .......... F16C 17/02; F16C 17/08; F16C 33/74; F16C 33/741; F16C 2370/12
See application file for complete search history.

(56) References Cited

U.S. PATENT DOCUMENTS

2006/0029312 A1* 2/2006 Kiriyama ............... F16C 33/103
                                                   384/107
2010/0226601 A1* 9/2010 Inazuka ............... H02K 5/1675
                                                   384/107

(Continued)

FOREIGN PATENT DOCUMENTS

JP   2002-061658   2/2002
JP   2004-263710   9/2004

(Continued)

OTHER PUBLICATIONS

Machine Translation JP 2004-263710 (Year: 2022).*

(Continued)

*Primary Examiner* — Audrey B. Walter
*Assistant Examiner* — Dapinder Singh
(74) *Attorney, Agent, or Firm* — Wenderoth, Lind & Ponack, L.L.P.

(57) ABSTRACT

A fluid dynamic bearing device 1 includes: a shaft member 2; a bearing sleeve 8 that has the shaft member 2 inserted into the inner periphery thereof; a housing 7 that holds the bearing sleeve 8 on the inner periphery thereof and has a bottomed cylindrical shape having an opening at an end portion on one axial side; and a seal member 9 provided at the opening of the housing 7. The seal member 9 has a disk portion 9a disposed on one axial side of the bearing sleeve 8, and a protrusion (cylindrical portion 9b) protruding to the other axial side from an outer diameter end of the disk portion 9a. An outer peripheral surface 9c of the seal member 9 is fixed to an inner peripheral surface 7a1 of the housing 7.

11 Claims, 4 Drawing Sheets

(56) References Cited

U.S. PATENT DOCUMENTS

2011/0176758 A1* 7/2011 Bito .................. F16C 17/107
                                                            384/121
2012/0294556 A1   11/2012 Kurimura
2015/0233417 A1    8/2015 Komatsubara et al.

FOREIGN PATENT DOCUMENTS

| JP | 2011-196544 | 10/2011 |
| JP | 2014-59014  | 4/2014  |
| JP | 2018-17262  | 2/2018  |

OTHER PUBLICATIONS

International Search Report dated Mar. 5, 2019 in International (PCT) Application No. PCT/JP2018/045171.
International Preliminary Report on Patentability and Written Opinion of the International Searching Authority dated Jun. 9, 2020 in corresponding International (PCT) Application No. PCT/JP2018/045171.

* cited by examiner

FLUID DYNAMIC BEARING DEVICE

TECHNICAL FIELD

The present invention relates to a fluid dynamic bearing device.

BACKGROUND ART

In a fluid dynamic bearing device, the pressure of an oil film generated in a radial bearing gap between an outer peripheral surface of a shaft and an inner peripheral surface of a bearing sleeve is increased with the rotation of the shaft, and the shaft is supported by the pressure in a noncontacting manner. Since the fluid dynamic bearing device has features such as high-speed rotation, high rotation accuracy, and low noise, the fluid dynamic bearing device is mounted on a motor of various electrical devices including information devices, and is mounted on a spindle motor incorporated in a disk drive such as an HDD, a cooling fan motor incorporated in a PC or the like, or a polygon scanner motor or the like incorporated in a laser beam printer.

For example, the following Patent Literature 1 discloses a fluid dynamic bearing device including a bottomed cylindrical housing, a bearing sleeve fixed to the inner periphery of the housing, a shaft member inserted into the inner periphery of the bearing sleeve, and a seal member (seal washer) fixed to an opening of the housing. Since the opening of the housing is covered with the seal member, oil in the housing is prevented from leaking to the outside.

The following Patent Literature 2 discloses that a bearing sleeve is fixed to the inner periphery of a housing through sandwiching of the bearing sleeve from both sides in the axial direction by a seal member (annular member) and a bottom portion of the housing. With this configuration, as compared with a case where the bearing sleeve is fixed to the inner periphery of the housing by press fitting, for example, the labor required for assembly can be reduced, and a decrease in precision of the radial bearing gap width due to deformation of the press-fitted bearing sleeve can be prevented.

CITATIONS LIST

Patent Literature

Patent Literature 1: JP 2002-61658 A
Patent Literature 2: JP 2014-59014 A

SUMMARY OF INVENTION

Technical Problems

In the fluid dynamic bearing device, in order to increase the bearing rigidity and stably support a rotating shaft, it is desirable to increase the axial dimension of the bearing sleeve as much as possible, and ensure a bearing span (axial interval between radial bearing portions (high-pressure generating portions) provided in two locations in axial direction). However, since the axial dimension of a motor in which the fluid dynamic bearing device is incorporated is limited, in order to ensure the axial dimension of the bearing sleeve to the maximum, it is necessary to reduce the axial dimension of the seal member disposed next to the bearing sleeve in the axial direction as much as possible.

When the axial dimension of the seal member is reduced in this way, the area of a fastening portion between an outer peripheral surface of the seal member and an inner peripheral surface of the housing is reduced, whereby the fixing strength of both parts becomes insufficient. Hence, when a large impact load or vibration is applied to the fluid dynamic bearing device, the fixing position of the seal member to the housing may be shifted. Particularly, in the case of a structure in which the bearing sleeve is fixed through sandwiching of the bearing sleeve from both sides in the axial direction by the seal member and the housing as in Patent Literature 2, when the seal member is shifted with respect to the housing, the fixing position of the bearing sleeve to the housing is also shifted. This may reduce the bearing performance significantly.

In view of the circumstances described above, an object of the present invention is to secure the fixing strength between a seal member and a housing even when the axial dimension of the seal member is reduced.

Solutions to Problems

In order to solve the above problems, the present invention provides a fluid dynamic bearing device including: a shaft member; a bearing sleeve that has the shaft member inserted into an inner periphery of the bearing sleeve; a bottomed cylindrical housing that holds the bearing sleeve in an inner periphery of the housing and has an opening at one axial end; a seal member that is provided at the opening of the housing; and a radial bearing portion that supports the shaft member in a relatively rotatable manner by an oil film generated in a radial bearing gap between an outer peripheral surface of the shaft member and an inner peripheral surface of the bearing sleeve, in which the seal member has a disk portion disposed on one side in the axial direction of the bearing sleeve and a protrusion protruding to the other side in the axial direction from an outer diameter end of the disk portion, and an outer peripheral surface of the seal member is fixed to an inner peripheral surface of the housing.

Thus, since the seal member is provided with a protrusion (e.g., cylindrical portion) that protrudes in the axial direction from the outer diameter end of the disk portion, and has an L-shaped cross section, the outer peripheral surface of the seal member can be extended in the axial direction to expand the area by the area of the protrusion, even when the thickness (axial dimension) of the disk portion is reduced. Accordingly, a sufficient fixing area between the outer peripheral surface of the seal member and the inner peripheral surface of the housing is secured, and the fixing strength of both parts can be secured.

In the above fluid dynamic bearing device, if the end surface of the disk portion of the seal member is brought into contact with the end surface of the bearing sleeve, the seal member can prevent the bearing sleeve from falling out from the housing. In this case, through increasing of the fixing strength between the seal member and the housing as described above, the displacement of the bearing sleeve with respect to the housing can be reliably prevented.

Incidentally, in the fluid dynamic bearing device described in Patent Literature 2, when oil expanded at a high temperature reaches the radial gap between the seal member and the shaft member, there is a high possibility that the oil leaks to the outside. In particular, when the axial dimension of the seal member is reduced as described above, the oil that reaches the radial gap between the seal member and the shaft member easily leaks to the outside.

Hence, in the above fluid dynamic bearing device, it is preferable to provide a first oil reservoir between the inner peripheral surface of the housing and the outer peripheral surface of the bearing sleeve. Since the first oil reservoir functions as a buffer for absorbing a change in oil volume, the expanded oil is less likely to reach the radial gap between the seal member and the shaft member, thereby reducing the risk of oil leakage. Additionally, since the first oil reservoir is provided on the outer periphery of the bearing sleeve, the first oil reservoir is separated from the radial gap between the seal member and the shaft member. Hence, the oil level held in the first oil reservoir is less likely to reach the radial gap, and oil leakage can be reliably prevented.

The first oil reservoir described above can have a wedge-shaped cross section whose radial width is gradually reduced toward one axial side (closed side of housing), for example. In this case, the oil held in the first oil reservoir is drawn into the closed side of the housing by capillary force, so that leakage of the oil from the first oil reservoir can be more reliably prevented.

In the above-described fluid dynamic bearing device, when the oil in the housing expands significantly at a high temperature, overflows from the first oil reservoir, and reaches the radial gap between the seal member and the shaft member, the oil easily leaks to the outside. Hence, if a recess is provided at the inner diameter end of the end surface of the disk portion of the seal member, and a second oil reservoir is defined by the recess, the end surface of the bearing sleeve, and the outer peripheral surface of the shaft member, the oil overflowing from the first oil reservoir and reaching the radial gap between the seal member and the shaft member can be held in the second oil reservoir. Thus, oil leakage can be prevented.

In the above-described fluid dynamic bearing device, if the bearing sleeve is sandwiched from both sides in the axial direction by the disk portion of the seal member and the housing, the bearing sleeve can be held in the axial direction in the housing. In this case, the protrusion of the seal member may be press-fitted into the gap between the inner peripheral surface of the housing and the outer peripheral surface of the bearing sleeve, and the outer peripheral surface of the protrusion and the inner peripheral surface of the housing, and the inner peripheral surface of the protrusion and the outer peripheral surface of the bearing sleeve may be fitted with an interference. As a result, since the bearing sleeve is tightened from the outer periphery by the seal member and the housing, the bearing sleeve can be firmly held in the housing in the radial direction, and the fastening force between the housing and the bearing sleeve is increased.

When the outer peripheral surface of the seal member and the inner peripheral surface of the housing are fitted with an interference as described above, it is preferable that the linear expansion coefficient of the seal member be larger than the linear expansion coefficient of the housing. In this case, when the temperature rises, the seal member expands in diameter to extend beyond the housing. Hence, the fastening force between the seal member and the housing is not impaired even at a high temperature.

Specifically, when the housing and the seal member are formed of a resin material blended with reinforcing fibers, for example, the linear expansion coefficient of the seal member can be made larger than the linear expansion coefficient of the housing, through setting of the compounding ratio of the reinforcing fibers in the resin material of the housing larger than the compounding ratio of the reinforcing fibers in the resin material of the seal member.

Alternatively, through forming of the housing from brass and forming of the seal member from a resin material, the linear expansion coefficient of the seal member can be made larger than the linear expansion coefficient of the housing.

As described above, when the seal member is press-fitted into the inner periphery of the housing, the outer peripheral surface of the housing expands due to the influence of the press-fitting. This may hinder the mounting of the fluid dynamic bearing device to another member (e.g., a motor bracket). Hence, it is preferable to provide a large-diameter outer peripheral surface and a small-diameter outer peripheral surface in the housing, and to fit the seal member with an interference to the axial region of the small-diameter outer peripheral surface. As described above, through forming of a portion of the outer peripheral surface of the housing that expands due to press-fitting of the seal member in a small diameter in advance, it is possible to avoid interference of this portion with another member.

Advantageous Effects of Invention

As described above, according to the present invention, it is possible to secure the fixing strength between a seal member and a housing and prevent displacement between the seal member and the housing, even when the axial dimension of the seal member is reduced.

DESCRIPTION OF EMBODIMENTS

Hereinafter, embodiments of the present invention will be described with reference to the drawings.

Figure 1:
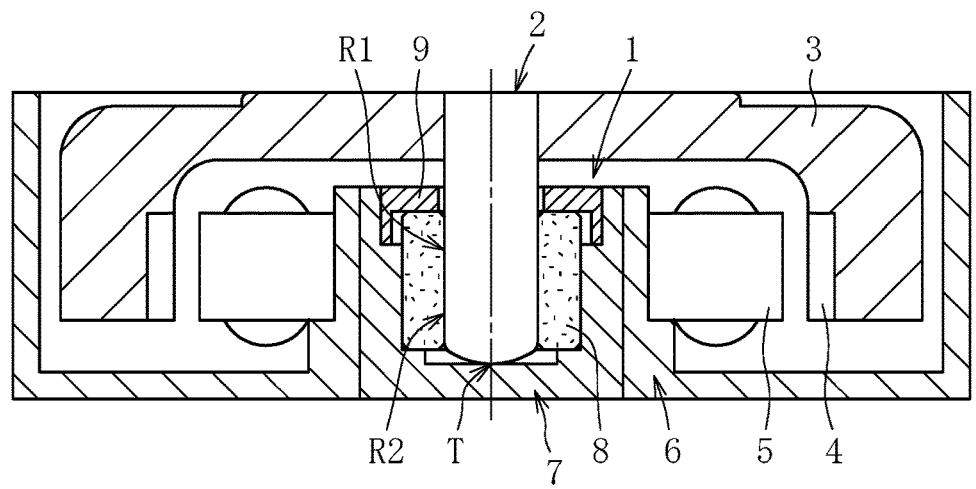
FIG. 1 is a cross-sectional view of a fan motor.

A fan motor shown in FIG. 1 includes a fluid dynamic bearing device 1 according to an embodiment of the present invention, a motor base 6 to which a housing 7 of the fluid dynamic bearing device 1 is fixed, and a rotor 3 fixed to a shaft member 2 of the fluid dynamic bearing device 1. A stator coil 5 is attached to the motor base 6, and a rotor magnet 4 facing the stator coil 5 with a radial gap interposed therebetween is attached to the rotor 3. When the stator coil 5 is energized, the rotor 3 and the shaft member 2 rotate integrally by electromagnetic force generated between the stator coil 5 and the rotor magnet 4, and an axial or radial airflow is generated by blades (not shown) provided on the rotor.

Figure 2:
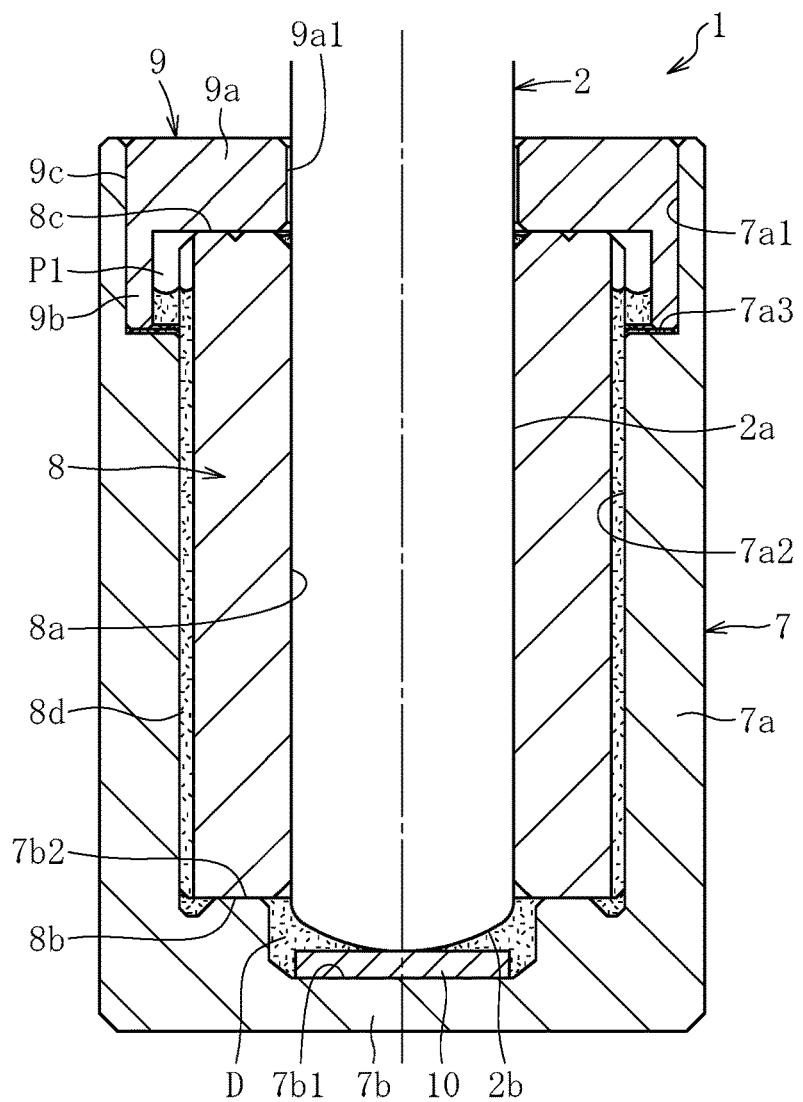
FIG. 2 is a cross-sectional view of a fluid dynamic bearing device according to an embodiment of the present invention.

As shown in FIG. 2, the fluid dynamic bearing device 1 includes, as main components, the shaft member 2, a bearing sleeve 8 that has the shaft member 2 inserted into the inner periphery thereof, the housing 7 that holds the bearing sleeve 8 on the inner periphery thereof and has a bottomed cylindrical shape having an opening at an end portion on one axial side, and a seal member 9 provided at the opening of the housing 7. An internal space of the housing 7 is filled with a predetermined amount of lubricating oil (indicated by dots in FIG. 2). The fluid dynamic bearing device 1 of the embodiment is mainly used in the posture shown in FIG. 2, that is, in a state where the opening side of the housing 7 is on the upper side in the axial direction. Note, however, that the fluid dynamic bearing device 1 is not limited to the above, and may be used in a state where the axial direction is horizontal, or a state where the opening side of the housing 7 is on the lower side, for example.

The shaft member 2 is formed of a metal material such as stainless steel. An outer peripheral surface 2a of the shaft member 2 is a smooth cylindrical surface having no irregularities, and has a constant outer diameter over the entire area in the axial direction. The outer diameter of the shaft member 2 is smaller than the inner diameters of the bearing sleeve 8 and the seal member 9. A protruding spherical surface 2b is provided at the lower end of the shaft member 2. The rotor 3 is fixed to the upper end of the shaft member 2 (see FIG. 1).

The housing 7 has a cylindrical side portion 7a and a bottom portion 7b that closes a lower end opening of the side portion 7a. In the embodiment, the side portion 7a and the bottom portion 7b of the housing 7 are integrally formed of metal or resin. On an inner peripheral surface of the side portion 7a, a large-diameter inner peripheral surface 7a1 provided at the upper end, a small-diameter inner peripheral surface 7a2 provided therebelow, and a flat surface 7a3 continuous with the surfaces are formed. An outer peripheral surface of the side portion 7a is a straight cylindrical surface. Consequently, of the side portion 7a, the thickness (radial dimension) of the axial region of the large-diameter inner peripheral surface 7a1 is smaller than the thickness of the axial region of the small-diameter inner peripheral surface 7a2. On an upper end surface of the bottom portion 7b, a bottom surface 7b1 provided at the shaft center and a shoulder surface 7b2 provided on the outer periphery of the bottom surface 7b1 are formed. The shoulder surface 7b2 is disposed above the bottom surface 7b1. In the embodiment, a resin thrust plate 10 is disposed on the bottom surface 7b1 of the housing 7, and an upper surface of the thrust plate 10 functions as a thrust bearing surface that comes into contact with and supports the protruding spherical surface 2b at the lower end of the shaft member 2. Note, however, that the thrust plate 10 is not necessarily provided, and may be omitted. In this case, the bottom surface 7b1 of the housing 7 functions as a thrust bearing surface.

The bearing sleeve 8 has a cylindrical shape and is formed of a metal, particularly a sintered metal, and specifically, a copper-iron based sintered metal containing copper and iron as main components, for example. Internal pores of the bearing sleeve 8 are impregnated with lubricating oil. The material of the bearing sleeve 8 is not limited to the above, and a molten metal material such as a copper alloy or an iron alloy, or a resin may be used, for example.

Figure 3:
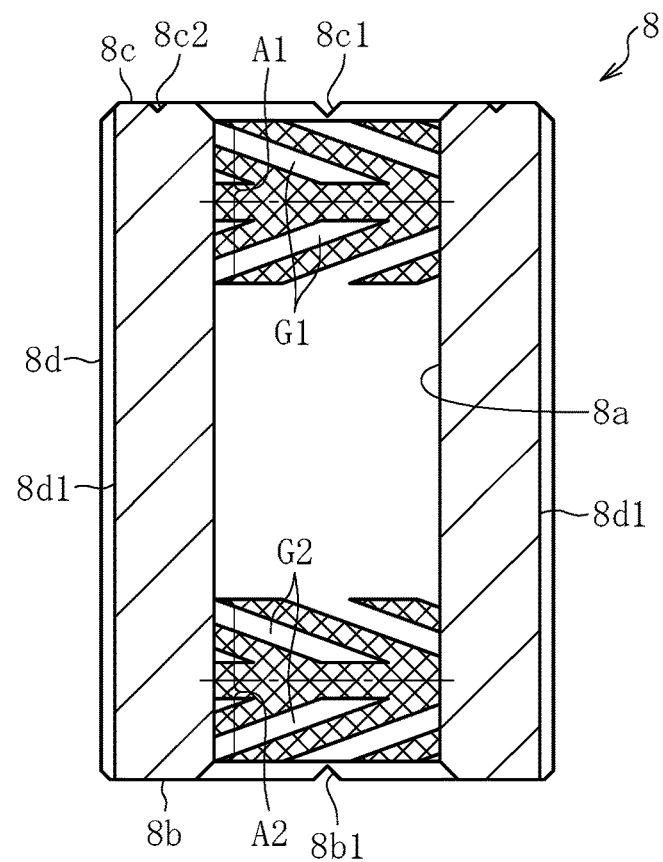
FIG. 3 is a cross-sectional view of a bearing sleeve.

A radial bearing surface is provided on an inner peripheral surface 8a of the bearing sleeve 8. In the embodiment, as shown in FIG. 3, radial bearing surfaces A1 and A2 are provided in two locations separated in the axial direction on the inner peripheral surface 8a of the bearing sleeve 8. A radial dynamic pressure generating portion is formed on each of the radial bearing surfaces A1 and A2. In the embodiment, herringbone-shaped dynamic pressure generating grooves G1 and G2 are formed as radial dynamic pressure generating portions. In the example of FIG. 3, each of the dynamic pressure generating grooves G1 and G2 has an axially symmetric shape. The region indicated by cross-hatching indicates a hill portion that rises toward the inner diameter side from the other areas. Note that the form of the radial dynamic pressure generating portion is not limited to the above, and spiral dynamic pressure generating grooves, a multi-arc bearing, or a step bearing may be employed, for example. Additionally, the radial bearing surfaces A1 and A2 of the bearing sleeve 8 may be smooth cylindrical surfaces, and a radial dynamic pressure generating portion may be formed on the outer peripheral surface 2a of the shaft member 2 facing the radial bearing surfaces A1 and A2.

Multiple axial grooves 8d1 are formed at regular intervals in the circumferential direction on an outer peripheral surface 8d of the bearing sleeve 8. Multiple radial grooves 8c1 and 8b1 are formed at regular intervals in the circumferential direction on an upper end surface 8c and a lower end surface 8b of the bearing sleeve 8, respectively. An annular groove 8c2 is formed on the upper end surface 8c of the bearing sleeve 8. The lower end surface 8b of the bearing sleeve 8 is in contact with the shoulder surface 7b2 provided in the bottom portion 7b of the housing 7.

Figure 4:
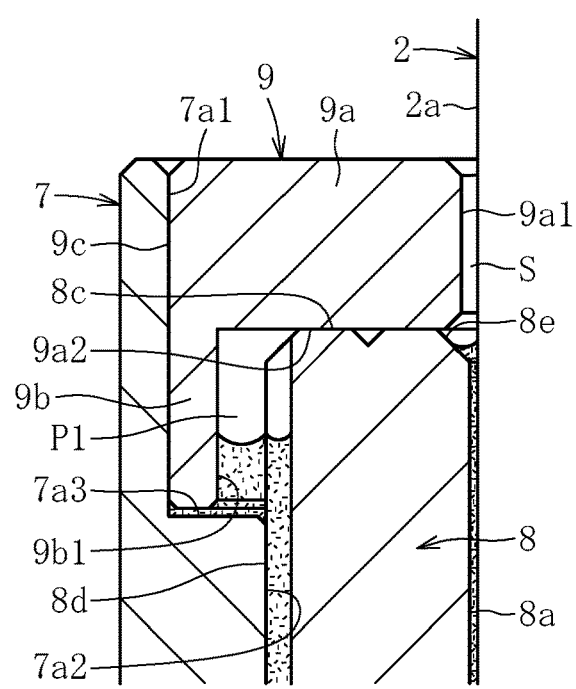
FIG. 4 is an enlarged view of FIG. 2.

As shown in FIG. 4, the seal member 9 has the disk portion 9a having an inner hole through which the shaft member 2 is inserted, and a protrusion protruding downward from the outer diameter end of the disk portion 9a. In the example of FIG. 4, the protrusion is configured by a cylindrical portion 9b provided in an annular shape. The seal member 9 is fixed to the opening of the housing 7. In the embodiment, an outer peripheral surface 9c of the seal member 9 is fixed to the large-diameter inner peripheral surface 7a1 provided at the upper end of the side portion 7a of the housing 7. The means for fixing the seal member 9 and the housing 7 is not limited, and press-fitting, bonding after clearance-fitting of both parts, press-fit bonding (combination of press-fitting and bonding), or ultrasonic welding or the like after forming of both parts from the same type of resin (resins using same base resin) may be adopted, for example. At this time, as described above, since the seal member 9 has an L-shaped cross section having the disk portion 9a and the cylindrical portion 9b, even when the disk portion 9a is thinned, the area of the outer peripheral surface 9c of the seal member 9 can be enlarged through extending of the cylindrical portion 9b downward. As a result, the fixing area between the outer peripheral surface 9c of the seal member 9 and the large-diameter inner peripheral surface 7a1 of the housing 7 is sufficiently secured, and the fixing strength of both members can be secured.

A radial gap S is formed between an inner peripheral surface 9a1 of the disk portion 9a of the seal member 9 and the outer peripheral surface 2a of the shaft member 2. The gap width of the radial gap S is set as small as possible in order to prevent oil leakage and to prevent foreign matter from entering from the outside. For example, in the case of a fluid dynamic bearing device having a shaft diameter of about 2 to 4 mm, the gap width of the radial gap S is set to about 0.3 mm or less. Additionally, the gap width of the radial gap S is larger than the gap width of a radial bearing gap formed between the inner peripheral surface 8a of the bearing sleeve 8 and the outer peripheral surface 2a of the shaft member 2.

The lower end surface 9a2 of the disk portion 9a of the seal member 9 is in contact with the upper end surface 8c of the bearing sleeve 8. With this configuration, the upward movement of the bearing sleeve 8 with respect to the housing 7 is restricted. In the embodiment, the bearing sleeve 8 is fixed to the inner periphery of the housing 7 through sandwiching of the bearing sleeve 8 from both sides in the axial direction by the seal member 9 and the housing 7. Specifically, the bearing sleeve 8 is fixed to the housing 7 through fitting of the outer peripheral surface 8d of the bearing sleeve 8 and the small-diameter inner peripheral surface 7a2 of the housing 7 with a gap interposed therebetween, and then sandwiching of the bearing sleeve 8 from both sides in the axial direction by the lower end surface 9$a$2 of the disk portion 9$a$ of the seal member 9 and the shoulder surface 7$b$2 provided in the bottom portion 7$b$ of the housing 7. As a result, as compared with a case where the bearing sleeve 8 is fixed to the housing 7 by press-fitting, the labor of the fixing work is reduced, and the deformation of the bearing sleeve 8 due to press-fitting can be avoided. Additionally, in the example of FIG. 4, an axial gap is formed between the lower end of the cylindrical portion 9$b$ of the seal member 9 and the flat surface 7$a$3 of the inner peripheral surface of the housing 7. As a result, the lower end surface 9$a$2 of the disk portion 9$a$ of the seal member 9 and the upper end surface 8$c$ of the bearing sleeve 8 can be reliably brought into contact with each other.

Of the inside of the housing 7, the lubricating oil is interposed at least in the radial bearing gap between the outer peripheral surface 2$a$ of the shaft member 2 and the radial bearing surfaces A1 and A2 of the inner peripheral surface 8$a$ of the bearing sleeve 8, and a sliding portion between the protruding spherical surface 2$b$ at the lower end of the shaft member 2 and the thrust plate 10. In the embodiment, the entire gap between the inner peripheral surface 8$a$ of the bearing sleeve 8 and the outer peripheral surface 2$a$ of the shaft member 2, and an entire space D (see FIG. 2) on the closed side that the protruding spherical surface 2$b$ of the shaft member 2 faces is filled with lubricating oil. As the lubricating oil, it is preferable to use a fluorine-based, ether-based, or silicon-based oil that provides stable lubricity and does not deteriorate in a high-temperature environment.

The fluid dynamic bearing device 1 is provided with a communication path that connects the space D on the closed side with the radial gap S between the shaft member 2 and the seal member 9 without passing through the radial bearing gap. In the embodiment, a communication path is formed between the lower end surface 8$b$ of the bearing sleeve 8 and the shoulder surface 7$b$2 of the housing 7, between the outer peripheral surface 8$d$ of the bearing sleeve 8 and the small-diameter inner peripheral surface 7$a$2 of the housing 7, and between the upper end surface 8$c$ of the bearing sleeve 8 and the lower end surface 9$a$2 of the disk portion 9$a$ of the seal member 9. In the example of FIG. 3, the communication path is configured by the radial groove 8$b$1 on the lower end surface 8$b$ of the bearing sleeve 8, the axial groove 8$d$1 on the outer peripheral surface 8$d$ of the bearing sleeve 8, and the radial groove 8$c$1 on the upper end surface 8$c$ of the bearing sleeve 8.

The fluid dynamic bearing device 1 of the embodiment has a so-called partially-filled structure in which the internal space of the housing 7, more specifically, a space on the inner side of the radial gap S adjacent to outside air and provided between the shaft member 2 and the seal member 9 is not entirely filled with lubricating oil, but has a void not filled with lubricating oil. Specifically, as shown in FIG. 4, an oil reservoir P1 (first oil reservoir) is formed between the large-diameter inner peripheral surface 7$a$1 of the housing 7 and the outer peripheral surface 8$d$ of the bearing sleeve 8, and an oil level is formed in the oil reservoir P1 at room temperature. In the example of FIG. 4, the oil reservoir P1 is formed between an inner peripheral surface 9$b$1 of the cylindrical portion 9$b$ of the seal member 9 and the outer peripheral surface 8$d$ of the bearing sleeve 8. On the other hand, the entire gap between the outer peripheral surface 2$a$ of the shaft member 2 and the inner peripheral surface 8$a$ of the bearing sleeve 8 is filled with lubricating oil by capillary force, and an oil level provided at the upper end of the lubricating oil reaches a gap between an upper end chamfer 8$e$ of the inner peripheral surface 8$a$ of the bearing sleeve 8 and the outer peripheral surface 2$a$ of the shaft member 2. As described above, of the internal space of the housing 7, a part of the oil reservoir P1, a part of the axial groove 8$d$1 on the outer peripheral surface 8$d$ of the bearing sleeve 8, the radial groove 8$c$1 on the upper end surface 8$c$ of the bearing sleeve 8, and a part of a space facing the upper end chamfer 8$e$ of the inner peripheral surface 8$a$ of the bearing sleeve 8 configure a void not filled with lubricating oil.

As described above, through providing of the oil level in the oil reservoir P1 formed inside the housing 7, a volume change of the lubricating oil in the housing 7 can be absorbed by the oil reservoir P1. Hence, expanded lubricating oil is less likely to reach the radial gap S adjacent to outside air, and oil leakage can be prevented. In particular, when the fluid dynamic bearing device 1 has a partially-filled structure as described above, the position of the oil level tends to fluctuate, and therefore oil leakage is likely to occur. Even in this case, since the oil reservoir P1 in the example of FIG. 4 is provided on the outer periphery of the bearing sleeve 8 and is separated from the radial gap S adjacent to outside air, the radial gap S makes it even less likely for the lubricating oil in the oil reservoir P1 to reach the radial gap S. Thus, oil leakage can be prevented reliably. Note that the oil level provided on the outer peripheral side of the bearing sleeve 8 may be provided below the oil reservoir P1. For example, an oil level may be provided in a communication path formed by the axial groove 8$d$1 on the outer peripheral surface 8$d$ of the bearing sleeve 8 and the small-diameter inner peripheral surface 7$a$2 of the housing 7.

On the other hand, since lubricating oil in the space facing the upper end chamfer 8$e$ of the inner peripheral surface 8$a$ of the bearing sleeve 8 is always drawn into the radial bearing gap side where the gap width is extremely small, the lubricating oil is not likely to leak to the outside. Accordingly, as described above, through providing of the oil reservoir P1 functioning as a buffer on the outer peripheral side of the bearing sleeve 8 and setting of the amount of oil to be injected into the housing 7 and the volume of the oil reservoir P1 so that the oil level may be held in the oil reservoir P1 within the operating temperature range of the fluid dynamic bearing device 1, oil leakage to the outside can be reliably prevented.

Note that although not shown, in order to more effectively prevent oil leakage through the radial gap S, an oil-repellent film may be formed on a region of the outer peripheral surface 2$a$ of the shaft member 2 that faces the inner peripheral surface 9$a$1 of the disk portion 9$a$ of the seal member 9, or on an upper end surface of the seal member 9.

The fluid dynamic bearing device 1 having the above configuration is assembled in the following procedure.

First, the bearing sleeve 8 is inserted into the inner periphery of the housing 7 with a clearance fit, and the lower end surface 8$b$ of the bearing sleeve 8 is brought into contact with the shoulder surface 7$b$2 of the bottom portion 7$b$ of the housing 7. Next, the seal member 9 is inserted into the side portion 7$a$ of the housing 7 from above, and the lower end surface 9$a$2 of the disk portion 9$a$ of the seal member 9 is brought into contact with the upper end surface 8$c$ of the bearing sleeve 8. In this state, the outer peripheral surface 9$c$ of the seal member 9 and the large-diameter inner peripheral surface 7$a$1 of the housing 7 are fixed. As a result, the bearing sleeve 8 is sandwiched from both sides in the axial direction by the seal member 9 and the shoulder surface 7b2 of the housing 7, and is fixed to the inner periphery of the housing 7.

Then, a predetermined amount of lubricating oil is injected into the internal space of the housing 7 (e.g., inner circumference of bearing sleeve 8). Thereafter, the shaft member 2 is inserted into the inner periphery of the seal member 9 and the bearing sleeve 8 from above. At this time, since air inside the housing 7 is discharged to the outside through the communication path (radial groove 8b1 on lower end surface 8b of bearing sleeve 8, axial groove 8d1 on the outer peripheral surface 8d, and radial groove 8c1 on upper end surface 8c) and the radial gap S, the shaft member 2 can be smoothly inserted into the inner periphery of the bearing sleeve 8, and oil leakage caused by the insertion of the shaft member 2 can be prevented. Then, through bringing of the protruding spherical surface 2b at the lower end of the shaft member 2 into contact with an end surface of the thrust plate 10, the fluid dynamic bearing device 1 shown in FIG. 2 is completed.

In the fluid dynamic bearing device 1 having the above-described configuration, when the shaft member 2 rotates, radial bearing gaps are formed between the radial bearing surfaces A1 and A2 of the inner peripheral surface 8a of the bearing sleeve 8 and the outer peripheral surface 2a of the shaft member 2 facing the radial bearing surfaces A1 and A2. Then, with the rotation of the shaft member 2, the pressure of the oil films formed in both radial bearing gaps is increased by the dynamic pressure generating grooves G1 and G2, and radial bearing portions R1 and R2 that support the shaft member 2 in a noncontacting manner in the radial direction are formed. Simultaneously, a thrust bearing T is formed to contact and support the protruding spherical surface 2b at the lower end of the shaft member 2 on the thrust bearing surface (upper end surface of thrust plate 10) provided on the bottom surface 7b1 of the housing 7.

In the fluid dynamic bearing device 1 described above, through reducing of the axial dimension of the disk portion 9a of the seal member 9, the axial dimension of the entire fluid dynamic bearing device 1 can be reduced, or the axial dimension of the bearing sleeve 8 can be increased to increase the bearing rigidity while maintaining the axial dimension of the entire fluid dynamic bearing device 1. At this time, since the seal member 9 has the cylindrical portion 9b extending downward from the disk portion 9a, even when the axial dimension of the disk portion 9a is reduced as described above, the area of the outer peripheral surface 9c of the seal member 9 can be secured. Thus, the fixing area between the outer peripheral surface 9c of the seal member 9 and the inner peripheral surface 7a1 of the housing 7 can be secured, and therefore the fixing strength of both parts can be secured.

The present invention is not limited to the above embodiment. Hereinafter, while other embodiments of the present invention will be described, overlapping descriptions of points similar to those of the above embodiment will be omitted.

Figure 5:
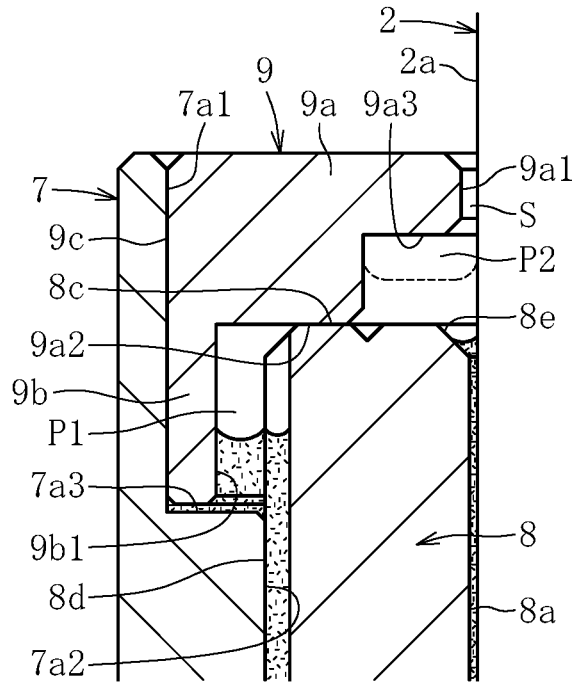
FIG. 5 is a cross-sectional view of a fluid dynamic bearing device according to another embodiment.

An embodiment shown in FIG. 5 differs from the above embodiment in that an annular recess 9a3 is provided at the inner diameter end of a lower end surface 9a2 of a disk portion 9a of a seal member 9. A space defined by the recess 9a3, an upper end surface 8c of a bearing sleeve 8, and an outer peripheral surface 2a of a shaft member 2 functions as a second oil reservoir P2. The second oil reservoir P2 has a larger radial width and volume than a radial gap S. At room temperature, the oil level is held in a first oil reservoir P1, but when the volume of the lubricating oil expands significantly at a high temperature, the lubricating oil overflowing from the first oil reservoir P1 is held in the second oil reservoir P2 (see dotted line in FIG. 5) after passing through a radial groove 8c1 on the upper end surface 8c of the bearing sleeve 8. Thus, through providing of the second oil reservoir P2 closer to the open atmosphere side than the first oil reservoir P1, the lubricating oil overflowing from the first oil reservoir P1 is held in the second oil reservoir P2, whereby oil leakage from the radial gap S can be reliably prevented.

Figure 6:
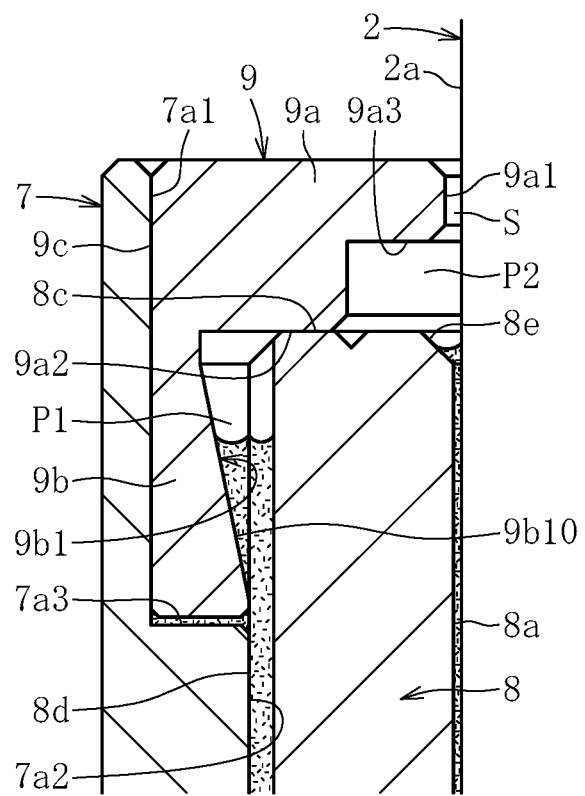
FIG. 6 is a cross-sectional view of a fluid dynamic bearing device according to yet another embodiment.

An embodiment shown in FIG. 6 differs from the above embodiment in that a tapered surface 9b10 is provided on an inner peripheral surface 9b1 of a cylindrical portion 9b of a seal member 9. A first oil reservoir P1 formed between the tapered surface 9b10 and the outer peripheral surface 8d of the bearing sleeve 8 has a wedge-shaped cross section whose radial dimension is gradually reduced downward. As a result, a downward pulling force acts on the oil held in the oil reservoir P1, so that leakage of oil from the oil reservoir P1 can be more reliably prevented. Note that while this embodiment, too, includes a recess 9a3 provided in a lower end surface 9a2 of a disk portion 9a of the seal member 9 to form a second oil reservoir P2 as similar to the embodiment shown in FIG. 5, the second oil reservoir P2 may be omitted.

Figure 7:
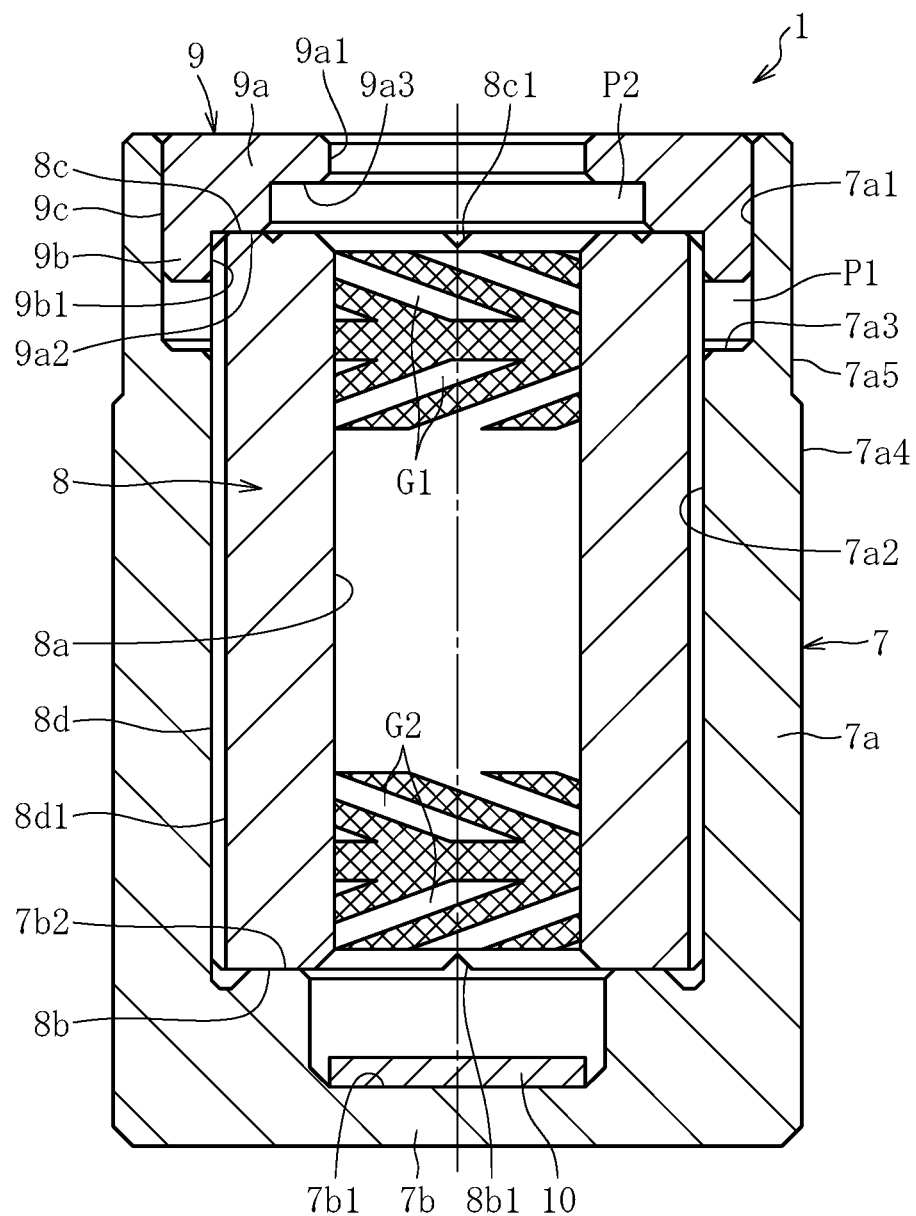
FIG. 7 is a cross-sectional view of a fluid dynamic bearing device according to still yet another embodiment.

In an embodiment shown in FIG. 7, a protrusion (cylindrical portion 9b) of a seal member 9 is press-fitted into a gap between a large-diameter inner peripheral surface 7a1 of a housing 7 and an outer peripheral surface 8d of a bearing sleeve 8. Specifically, an outer peripheral surface 9c of the seal member 9 (outer peripheral surface of disk portion 9a and outer peripheral surface of cylindrical portion 9b) and the large-diameter inner peripheral surface 7a1 of the housing 7 are fitted with an interference, and an inner peripheral surface 9b1 of the cylindrical portion 9b of the seal member 9 and the outer peripheral surface 8d of the bearing sleeve 8 are fitted with an interference. In this case, the bearing sleeve 8 is not only held in the axial direction by being sandwiched from both sides in the axial direction by the lower end surface 9a2 of the disk portion 9a of the seal member 9 and the shoulder surface 7b2 of the housing 7, but is also held in the radial direction through the cylindrical portion 9b of the seal member 9. Hence, the fastening strength of the bearing sleeve 8 to the housing 7 is further increased.

In this embodiment, a space surrounded by the lower end of the cylindrical portion 9b of the seal member 9, the outer peripheral surface 8d of the bearing sleeve 8, and the large-diameter inner peripheral surface 7a1 of the housing 7 functions as a first oil reservoir P1. At room temperature, the oil level (not shown) is held in the first oil reservoir P1, and in particular, the oil level is held below the cylindrical portion 9b of the seal member 9. In this case, the axial dimension (i.e., volume) of the first oil reservoir P1 is determined by the axial dimension of the cylindrical portion 9b of the seal member 9. Accordingly, the seal member 9 is designed so as to (i) secure a required volume of the first oil reservoir P1, and (ii) secure a required fastening force (fixing area) between the seal member 9 and the housing 7. Additionally, if a flat surface 7a3 of the inner peripheral surface of the housing 7 is lowered and the large-diameter inner peripheral surface 7a1 is extended downward, the volume of the first oil reservoir P1 can be increased. However, since the axial dimension of a thin portion formed by the large-diameter inner peripheral surface 7a1 of the housing 7 increases in this case, the rigidity decreases, and the fixing force between the housing 7 and the seal member 9 may decrease. Accordingly, the housing 7 is designed in consideration of (i) the volume of the first oil reservoir P1 and (ii) the fastening force between the seal member 9 and the housing 7 (rigidity of thin portion of housing 7).

Additionally, in this embodiment, materials of the seal member 9 and the housing 7 are selected such that the linear expansion coefficient of the seal member 9 is larger than the linear expansion coefficient of the housing 7. In this case, in a high-temperature environment, the outer peripheral surface 9c of the seal member 9 expands in diameter to extend beyond the large-diameter inner peripheral surface 7a1 of the housing 7. This prevents deterioration in the fastening force (interference) between the seal member 9 and the housing 7 due to the temperature increase, and can secure the fastening strength of both parts.

For example, when the seal member 9 is formed of a resin material, it is preferable to use a material that can be used in a high-temperature environment and has a high deflection temperature under load as the base resin. For example, polyphenylenesulfide (PPS), liquid-crystal polymer (LCP), polybutylene terephthalate (PBT), or the like can be used. When the base resin is blended with reinforcing fibers, the linear expansion coefficient of the seal member 9, particularly the coefficient of linear expansion in the radial direction (direction orthogonal to flow direction of resin during injection molding), is about $2\sim7\times10-5/°$ C.

Additionally, when the housing 7 is formed of a resin material, PPS, LCP, PBT, or the like can be used as the base resin, as similar to the seal member 9. For example, when the housing 7 is formed of a resin material using the same base resin as the seal member 9, the linear expansion coefficient of the seal member 9 can be made larger than the linear expansion coefficient of the housing 7 through increasing of the compounding ratio of the reinforcing fibers even slightly more than the seal member 9. Additionally, in this case, if the housing 7 and the seal member 9 are joined by ultrasonic welding, the fastening strength between both parts is increased even more.

In addition, as the base resin of the resin material of the housing 7, a material having a smaller linear expansion coefficient than the base resin of the resin material of the seal member 9 may be used. Alternatively, the housing 7 may be formed of a metal material such as brass, and the seal member 9 may be formed of a resin material having a larger linear expansion coefficient than the housing 7.

Note that the linear expansion coefficient of the bearing sleeve 8 is determined by the composition (mixing ratio of iron and copper), and is usually smaller than that of the seal member 9, such as about $1.5\times10-5/°$ C.

Additionally, in this embodiment, the large-diameter outer peripheral surface 7a4 and the small-diameter outer peripheral surface 7a5 are provided on the outer peripheral surface of the housing 7. The outer peripheral surface 9c of the seal member 9 is fitted with an interference to the axial region of the housing 7 where the small-diameter outer peripheral surface 7a5 is provided. In the embodiment, the small-diameter outer peripheral surface 7a5 is provided in an axial region including the entire large-diameter inner peripheral surface 7a1. With this configuration, when the outer peripheral surface 9c of the seal member 9 is press-fitted into the large-diameter inner peripheral surface 7a1 of the housing 7, even if the small-diameter outer peripheral surface 7a5 of the housing 7 expands, it can be kept from expanding larger in diameter than the large-diameter outer peripheral surface 7a4. Hence, the fluid dynamic bearing device 1 can be mounted on the inner periphery of a bracket 6 (see FIG. 1) without any trouble.

The above embodiments have been given of the case where an annular (cylindrical) protrusion of the seal member 9 is provided, but the present invention is not limited to this. For example, a protrusion protruding downward from the outer diameter end of the disk portion 9a of the seal member 9 may be provided in multiple locations spaced apart in the circumferential direction.

Additionally, the above embodiments have been given of the case where the thrust bearing T is configured by a so-called pivot bearing in which the shaft member 2 is supported in the thrust direction through causing of the protruding spherical surface 2b at the lower end of the shaft member 2 and the thrust bearing surface (thrust plate 10) to come into contact with each other and slide. However, the present invention is not limited to this, and the thrust bearing T may be configured by a so-called fluid dynamic bearing. In this case, a flange may be provided at the lower end of the shaft member, and both end surfaces of the flange may be supported in both thrust directions by a fluid dynamic bearing.

Additionally, in the above embodiments, the fluid dynamic bearing device 1 having the partially-filled structure has been shown in which the void not filled with the lubricating oil is provided in the internal space of the housing 7. However, the present invention is not limited to this, and may be applied to a so-called fully-filled fluid dynamic bearing device in which the internal space of the housing 7 is filled with lubricating oil (not shown).

Additionally, while the above embodiments have been given of the case where the shaft member 2 is on the rotating side and the housing 7 and the bearing sleeve 8 are on the fixed side, conversely, the shaft member 2 may be on the fixed side and the housing 7 and the bearing sleeve 8 may be on the rotating side.

Additionally, while the above embodiments have been given of the case where the fluid dynamic bearing device 1 is applied to a fan motor, the present invention is not limited to this, and may be applied to a spindle motor of a disk drive device such as a hard disk drive (HDD) or a polygon scanner of a laser beam printer, for example.

REFERENCE SIGNS LIST 1 fluid dynamic bearing device
2 shaft member
7 housing
8 bearing sleeve
9 seal member
9a disk portion
9b cylindrical portion (protrusion)
10 thrust plate
P1 oil reservoir (first oil reservoir)
P2 second oil reservoir
A1, A2 radial bearing surface
G1, G2 dynamic pressure generating groove
R1, R2 radial bearing portion
T thrust bearing

The invention claimed is:
1. A fluid dynamic bearing device comprising:
a shaft member;
a bearing sleeve that has the shaft member inserted into an inner periphery of the bearing sleeve;
a bottomed cylindrical housing that holds the bearing sleeve in an inner periphery of the bottomed cylindrical housing and has an opening at an end portion on one axial side;

a seal member that is provided at the opening of the bottomed cylindrical housing; and a radial bearing portion that supports the shaft member in a relatively rotatable manner by an oil film generated in a radial bearing gap between an outer peripheral surface of the shaft member and an inner peripheral surface of the bearing sleeve, wherein the seal member has a disk portion disposed on one axial side of the bearing sleeve and a protrusion protruding to another axial side from an outer diameter end of the disk portion, an outer peripheral surface of the seal member is fixed to an inner peripheral surface of the bottomed cylindrical housing, and a first oil reservoir is formed between the inner peripheral surface of the bottomed cylindrical housing and an outer peripheral surface of the bearing sleeve, an oil level being provided in the first oil reservoir.

2. The fluid dynamic bearing device according to claim 1, wherein an end surface of the disk portion of the seal member is brought into contact with an end surface of the bearing sleeve.

3. The fluid dynamic bearing device according to claim 1, wherein the first oil reservoir has a wedge-shaped cross section whose radial width is gradually reduced toward the another axial side.

4. The fluid dynamic bearing device according to claim 1, wherein a recess is provided at an inner diameter end of an end surface of the disk portion of the seal member, and a second oil reservoir is defined by the recess, an end surface of the bearing sleeve, and the outer peripheral surface of the shaft member.

5. The fluid dynamic bearing device according to claim 1, wherein the bearing sleeve is sandwiched from both sides in the axial direction by the disk portion of the seal member and the bottomed cylindrical housing.

6. The fluid dynamic bearing device according to claim 5, wherein an outer peripheral surface of the protrusion of the seal member and the inner peripheral surface of the bottomed cylindrical housing are fitted with an interference.

7. The fluid dynamic bearing device according to claim 6, wherein an inner peripheral surface of the protrusion of the seal member and the outer peripheral surface of the bearing sleeve are fitted with an interference.

8. The fluid dynamic bearing device according to claim 6, wherein a linear expansion coefficient of the seal member is larger than a linear expansion coefficient of the bottomed cylindrical housing.

9. The fluid dynamic bearing device according to claim 8, wherein the bottomed cylindrical housing and the seal member are formed of a resin material blended with reinforcing fibers, and a compounding ratio of the reinforcing fibers in the resin material of the bottomed cylindrical housing is larger than a compounding ratio of the reinforcing fibers in the resin material of the seal member.

10. The fluid dynamic bearing device according to claim 8, wherein the bottomed cylindrical housing is formed of brass, and the seal member is formed of a resin material.

11. The fluid dynamic bearing device according to claim 6, wherein the bottomed cylindrical housing has a large-diameter outer peripheral surface and a small-diameter outer peripheral surface, and the seal member is fitted with an interference to an axial region of the small-diameter outer peripheral surface.

* * * * *